(12) United States Patent
Wortmann et al.

(10) Patent No.: US 10,358,944 B2
(45) Date of Patent: Jul. 23, 2019

(54) SOLAR POWER PLANT COMPRISING A FIRST HEAT TRANSFER CIRCUIT AND A SECOND HEAT TRANSFER CIRCUIT

(71) Applicant: BASF SE, Ludwigshafen (DE)

(72) Inventors: Jürgen Wortmann, Limburgerhof (DE); Michael Landenberger, Annweiler am Trifels (DE); Katharina Federsel, Eppelheim (DE); Stephan Maurer, Neustadt (DE)

(73) Assignee: BASF SE (DE)

( * ) Notice: Subject to any disclaimer, the term of this patent is extended or adjusted under 35 U.S.C. 154(b) by 0 days.

(21) Appl. No.: 15/548,991

(22) PCT Filed: Feb. 4, 2016

(86) PCT No.: PCT/EP2016/052427
§ 371 (c)(1),
(2) Date: Aug. 4, 2017

(87) PCT Pub. No.: WO2016/124709
PCT Pub. Date: Aug. 11, 2016

(65) Prior Publication Data
US 2018/0023421 A1    Jan. 25, 2018

(30) Foreign Application Priority Data
Feb. 5, 2015  (EP) ...................................... 15153990

(51) Int. Cl.
*F01K 3/12*  (2006.01)
*F03G 6/06*  (2006.01)
(Continued)

(52) U.S. Cl.
CPC ................ *F01K 3/12* (2013.01); *F03G 6/067* (2013.01); *F22B 1/006* (2013.01); *F22B 37/421* (2013.01);
(Continued)

(58) Field of Classification Search
CPC ..... Y02E 60/14; Y02E 60/142; Y02E 60/145; Y02E 10/40–46; F28F 2265/00;
(Continued)

(56) References Cited

U.S. PATENT DOCUMENTS

| RE25,808 | E | * | 6/1965 | Amorosi | ................. F22B 1/063 165/11.1 |
| 4,368,694 | A | | 1/1983 | Ward et al. | |

(Continued)

FOREIGN PATENT DOCUMENTS

CH          647067 A5    12/1984
CN       103485990 A     1/2014
(Continued)

OTHER PUBLICATIONS

U.S. Appl. No. 15/518,791, filed Apr. 13, 2017, BASF SE.
(Continued)

*Primary Examiner* — Mark A Laurenzi
*Assistant Examiner* — Mickey H France
(74) *Attorney, Agent, or Firm* — Drinker Biddle & Reath LLP

(57) ABSTRACT

The invention relates to a solar power plant with a first heat transfer medium circuit and with a second heat transfer medium circuit, in which the first heat transfer medium circuit comprises a store (3) for hot heat transfer medium and a store (5) for cold heat transfer medium and also a pipeline system (6) connecting the stores (3, 5) for hot heat transfer medium and for cold heat transfer medium and leading through a solar array (7), and the second heat transfer medium circuit comprises a pipeline system (9) connecting the stores (3, 5) for hot heat transfer medium and for cold heat transfer medium and in which at least one heat exchanger (11) for the evaporation and superheating of water is accommodated, the at least one heat exchanger (11) having a region through which the heat transfer medium flows and a region through which water flows, said regions being separated by a heat-conducting wall, so that heat can be transmitted from the heat transfer medium to the water. Each heat exchanger (11) has a break detection system (21), (Continued)

Figure 1:
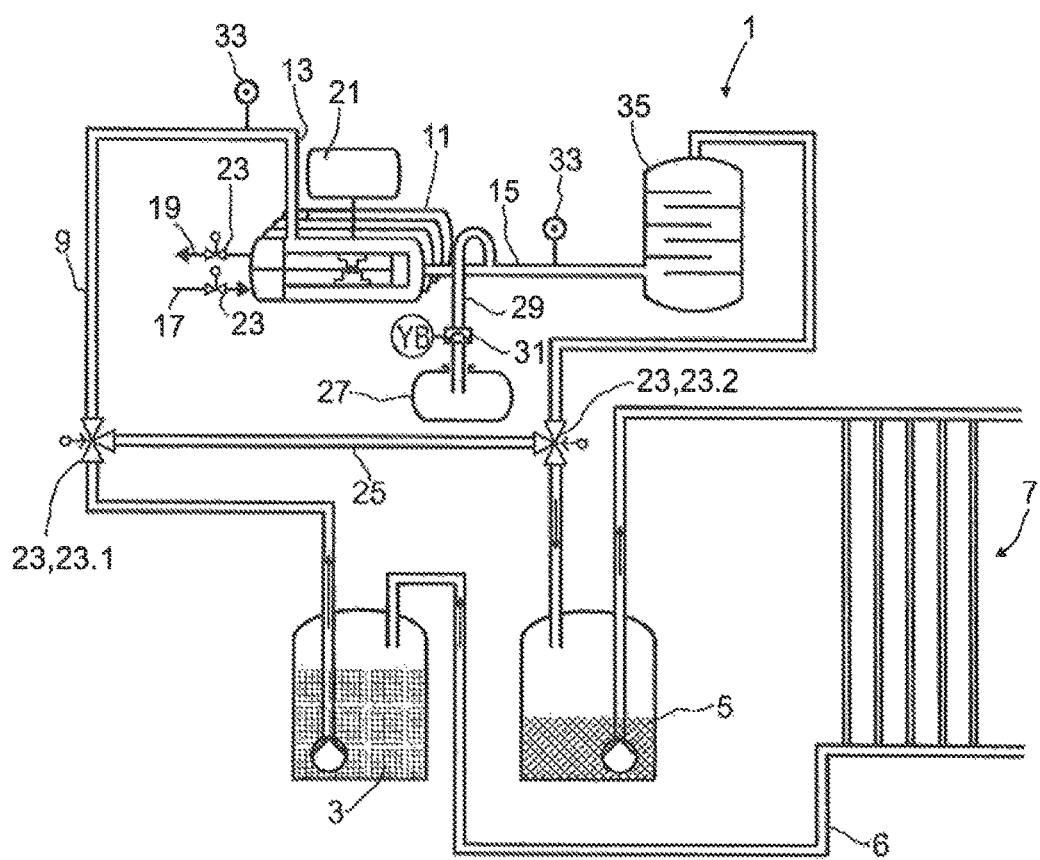

by means of which a possible break of the heat-conducting wall can be detected, and valves (23) for the closing of supply lines (13, 17) and outflow lines (15, 19) for heat transfer medium and water, upon the detection of a break the valves (23) in the supply lines (13, 17) and outflow lines (15, 19) for heat transfer medium and water being closed.

16 Claims, 2 Drawing Sheets

(51) Int. Cl.
| | |
|---|---|
| *F22B 1/00* | (2006.01) |
| *F22B 37/42* | (2006.01) |
| *F24S 20/20* | (2018.01) |
| *F24S 40/00* | (2018.01) |
| *F24S 40/60* | (2018.01) |
| *F24S 80/20* | (2018.01) |

(52) U.S. Cl.
CPC ............... *F24S 20/20* (2018.05); *F24S 40/00* (2018.05); *F24S 40/60* (2018.05); *F24S 80/20* (2018.05); *F28F 2265/16* (2013.01); *Y02E 10/41* (2013.01); *Y02E 10/46* (2013.01)

(58) Field of Classification Search
CPC ..... F28F 2265/12; F28F 2265/16; F03G 6/00; F03G 6/003; F03G 6/005; F03G 6/06; F03G 6/065; F03G 6/067; F22B 37/421; F24J 2/4634; F28D 20/00–028
USPC .................. 60/659, 641.6–641.15, 646, 657; 165/11.1, 11.2
See application file for complete search history.

(56) References Cited

U.S. PATENT DOCUMENTS

| | | | |
|---|---|---|---|
| 6,701,711 B1 * | 3/2004 | Litwin | F02C 1/05 60/641.11 |
| 8,872,255 B2 | 10/2014 | Hall et al. | |
| 9,206,261 B2 | 12/2015 | Macdonald et al. | |
| 9,347,596 B2 | 5/2016 | Wortmann et al. | |
| 9,527,579 B2 | 12/2016 | Carvalho | |
| 9,533,623 B2 | 1/2017 | Descoteaux | |
| 2012/0137683 A1 | 6/2012 | Jürgen et al. | |
| 2013/0056081 A1 | 3/2013 | Wortmann et al. | |
| 2013/0291857 A1 | 11/2013 | Litwin et al. | |
| 2014/0026892 A1 | 1/2014 | Drake et al. | |
| 2014/0033708 A1 | 2/2014 | Gröppel et al. | |
| 2014/0047837 A1 | 2/2014 | Wortmann et al. | |
| 2014/0110080 A1 | 4/2014 | Bergan | |
| 2014/0135567 A1 | 5/2014 | Marotta | |
| 2014/0182720 A1 | 7/2014 | Wortmann et al. | |
| 2016/0001184 A1 | 1/2016 | Sepulveda et al. | |
| 2016/0059042 A1 | 3/2016 | Russo et al. | |
| 2016/0124709 A1 | 5/2016 | Bekas et al. | |
| 2017/0009749 A1 | 1/2017 | Wortmann et al. | |
| 2017/0010024 A1 | 1/2017 | Wortmann et al. | |
| 2017/0074597 A1 | 3/2017 | Wortmann et al. | |
| 2017/0205151 A1 | 7/2017 | Wortmann et al. | |

FOREIGN PATENT DOCUMENTS

| | | |
|---|---|---|
| CN | 203704396 U | 7/2014 |
| DE | 102011005481 A1 | 9/2012 |
| DE | 102011007370 A1 | 10/2012 |
| DE | 102011007650 A1 | 10/2012 |
| EP | 2600058 A1 | 6/2013 |
| JP | H0428901 A | 1/1992 |
| JP | 2013029252 A | 2/2013 |
| WO | WO-2013034587 A1 | 3/2013 |
| WO | WO-2016/059042 | 4/2016 |

OTHER PUBLICATIONS

International Preliminary Report on Patentability (in German) for PCT/EP2016/052427 dated May 19, 2017.
International Search Report for PCT/EP2016/052427 dated Jun. 29, 2016.

* cited by examiner

SOLAR POWER PLANT COMPRISING A FIRST HEAT TRANSFER CIRCUIT AND A SECOND HEAT TRANSFER CIRCUIT

CROSS-REFERENCE TO RELATED APPLICATIONS

This application is a national stage application (under 35 U.S.C. § 371) of PCT/EP2016/052427, filed Feb. 4, 2016, which claims benefit of European Application No. 15153990.5, filed Feb. 5, 2015, both of which are incorporated herein by reference in their entirety.

The invention proceeds from a solar power plant with a first heat transfer medium circuit and with a second heat transfer medium circuit, in which the first heat transfer medium circuit comprises a store for hot heat transfer medium and a store for cold heat transfer medium and also a pipeline system connecting the stores for hot heat transfer medium and for cold heat transfer medium and leading through a solar array, and the second heat transfer medium circuit comprises a pipeline system connecting the stores for hot heat transfer medium and for cold heat transfer medium and in which at least one heat exchanger for the evaporation and superheating of water is accommodated, the heat exchanger having a region through which the heat transfer medium flows and a region through which water flows, said regions being separated by a heat-conducting wall, so that heat can be transmitted from the heat transfer medium to the water.

Solar power plants are conventionally used to convert solar energy into electrical energy. In linearly concentrating solar power plants, such as parabolic trough solar power plants or Fresnel solar power plants, or in tower power plants, for this purpose, a heat transfer medium is heated by means of radiating solar energy and is intermediately stored in a hot store. The central receiver of a tower power plant in this case corresponds to the solar array of a linearly concentrating solar power plant. This enables electrical energy to be generated even during times when the sun is not shining. The heated heat transfer medium is utilized in order to evaporate and superheat water in a heat exchanger. For this purpose, the heat transfer medium is conducted out of the hot store through the heat exchanger and is subsequently collected in a cold store. The heat transfer medium from the cold store can then be heated again by radiating solar energy. The superheated steam generated is utilized in order to drive a turbine which is connected to a generator for current generation. To heat the heat transfer medium, the latter is conducted through what are known as receivers, in which the incident solar radiation is focused with the aid of mirrors and is directed onto a pipeline through which the heat transfer medium flows.

For the efficient operation of the solar power plant, the heat transfer medium used is, as a rule, molten salt which can be heated to temperatures of more than 400° C. Salts which are conventionally used as heat transfer medium are nitrates or nitrites of alkali metals, for example potassium nitrate, potassium nitrite, sodium nitrate, sodium nitrite or mixtures thereof. A suitable salt is, for example, what is known as solar salt, a mixture of potassium nitrate and sodium nitrate in a mass ratio of 40:60.

In the heat exchanger for the evaporation and superheating of steam, the heat transfer medium flows through a first region and water flows through a second region. The region through which the heat transfer medium flows is separated from the region through which water flows via a heat-conducting wall. Heat exchangers which are conventionally used are, for example, tube bundle heat exchangers, in which one medium flows through tubes and the second medium flows through the region surrounding the tubes. Further heat exchangers which are conventionally used are, for example, plate heat exchangers or spiral heat exchangers.

In heat exchangers for the preheating, the evaporation and superheating of water, such as are employed in solar power plants, steam is conventionally generated with a pressure of more than 100 bar, perspectively up to 280 bar, in super-critical power plants. On the other hand, as a rule, the pressure of the heat transfer medium in linearly concentrating solar power plants amounts to less than 20 bar and in tower power plants to less than 30 bar. On account of this high pressure difference, together with high throughflows which may generate vortices and therefore pressure fluctuations and consequently oscillations, the heat exchanger and, in particular, the walls which separate the water from the heat transfer medium are exposed to high continuous mechanical load which may lead to the failure of the wall as a result of breakage. This consequently results in copious infiltration of water into the heat transfer medium. At the temperatures occurring in solar power plants of, for example, 565° C. in current tower power plants, water has a decomposing effect upon the nitrates and nitrites of alkali metals which are used as heat transfer medium. Thus, in the presence of water, nitrates which are of a substantially higher melting point are formed from nitrites. In addition, nitrogen oxides and alkali hydroxides are formed. The nitrogen oxides contribute in this case to volume expansion which leads to a marked pressure rise when outflow is obstructed, for example because the first heat transfer medium circuit is closed. This pressure rise can subsequently lead to the destruction of further plant parts, for example of the stores. In current solar power plants, this scenario can be counteracted only by sufficiently dimensioned plant parts.

As well as the additional mechanical load which occurs due to the formation of nitrogen oxides and to the associated pressure rise, there is also chemical load upon the plant, since the alkali metal hydroxides which are formed are highly basic and at the high temperatures also have corrosive action upon high-alloy steels. This leads to a reduced service life of the plant components. The conversion of nitrites into nitrates and the accompanying increase in the melting temperature may additionally lead to a loss of ability to use the molten salt employed as heat transfer medium, since this may freeze at the temperatures designed for the original composition, and damage to the solar power plant may result from this. Regeneration of the molten salt with neutralization of the base and reduction of the nitrates is admittedly possible, in principle, but cannot always be carried out readily in existing plants.

In order to avoid damage caused by breakage of the walls in the heat exchanger, for example, heat exchangers which have double walls are used at the present time. As a result, only one wall breaks first and the second wall prevents complete failure. The breakage of one wall can be detected by means of interspace monitoring, and in the event of breakage the operation of the heat exchanger can be interrupted in good time before further damage occurs. The disadvantage of such a double wall, however, is that its ability to transmit heat is poor in comparison with a single wall.

EP-A 2 600 058 discloses that in pipes through which a working medium flows, for example water, shut-off devices are provided. A salt melt which flows around the pipes is used for example is used as heat transfer medium. The shut-off devices are used to control the flux density of the working medium through the heat exchanger for avoiding static or dynamic instabilities. The shut-off devices do not close the supply lines for the heat transfer medium and, therefore, can not prevent that heat transfer medium contaminated with water reaches a following storing system. Principally, the said shut-off devices only can provide a partial protection of a heat exchanger by closing the water supply. Further, it must be considered that regulating actuators without additional equipment are not that tight to be used as closing devices, and therefore can not be used for a sufficiently tight closure of the water supply.

The object of the present invention is therefore to provide a solar power plant which can be operated reliably without the disadvantages of the known apparatuses, such as reduced ability to transmit heat.

This object is achieved by means of a solar power plant with a first heat transfer medium circuit and with a second heat transfer medium circuit, in which the first heat transfer medium circuit comprises a store for hot heat transfer medium and a store for cold heat transfer medium and also a pipeline system connecting the stores for hot heat transfer medium and for cold heat transfer medium and leading through a solar array, and the second heat transfer medium circuit comprises a pipeline system connecting the stores for hot heat transfer medium and for cold heat transfer medium and in which at least one heat exchanger for the evaporating and superheating of water is accommodated, the at least one heat exchanger having a region through which the heat transfer medium flows and a region through which water flows, which regions are separated by a heat-conducting wall, so that heat can be transmitted from the heat transfer medium to the water, each heat exchanger having a break detection system, by means of which a possible break of the heat-conducting wall can be detected, and valves for the closing of supply lines and outflow lines for heat transfer medium and water, upon the detection of a break the valves in the supply lines and outflow lines for heat transfer medium and water being closed.

In the context of the present invention, the term "water" is used independently of the state of aggregation. In the inflow to the heat exchanger, the water is liquid, and inside the heat exchanger, in which the water is evaporated and superheated, it is present as saturated steam and superheated steam, so that the water leaves the heat exchanger in the form of saturated steam or superheated steam through the outflow line.

Preheater, evaporator and superheater mostly are constructed in form of tube bundle heat exchangers. In one embodiment, the working medium, for example water, is guided through the pipes of the tube bundle of the heat exchanger. The heat transfer medium, for example a salt melt, is outside the pipes in the heat exchanger vessel and heats the working medium which flows though the pipes. Due to relative small pipe diameters low wall thicknesses are sufficient to hold high pressures in the pipes. The steam generation takes place inside the pipes.

Therefore, in this embodiment the pipes are under pressure. However, alternatively it is possible to guide the working medium through the heat exchanger vessel and the heat transfer medium, for example a salt melt, through the pipes. In this embodiment the heat exchanger vessel is under pressure. Both embodiments are independently usable for the preheater, the evaporator and the superheater. This means that for example it is possible to realize the evaporator according to the second embodiment in which the heat transfer medium flows through the pipes and the superheater in the first embodiment in which the working medium flows through the pipes. However, all further combinations also can be used.

The closing of the supply lines and outflow lines for heat transfer medium and water prevents, on the one hand, the situation where, after a break, water can continue to flow, unimpeded, into the first heat transfer medium circuit and, on the other hand, the situation where heat transfer medium contaminated with water does not continue to flow in the first heat transfer medium circuit and, in particular, does not enter the store for cold heat transfer medium in which full intermixing can otherwise take place. The damage is limited to the region of the heat exchanger and also contact of the heat transfer medium with the water occurs only in the region of the heat exchanger between the valves for closing the supply lines and outflow lines for heat transfer medium and water into the heat exchanger and out of the heat exchanger.

In a preferred embodiment, more than one heat exchanger is comprised, in which the water is preheated, evaporated and superheated. In the case of a larger number of heat exchangers, it is possible to produce these in a smaller size, with the result that susceptibility to failure due to breakage is reduced. Furthermore, by virtue of this measure, even in the event of breakage the extent of damage is reduced, since smaller apparatuses possess smaller flow cross sections. If a plurality of heat exchangers are provided, these may be connected in parallel, so that only part of the water and of the heat transfer medium flows through each heat exchanger. In addition, it is also possible to connect heat exchangers in series, so that complete preheating, evaporation and superheating is not carried out in one heat exchanger. The advantage of this is that a break can be more easily located and isolated.

In order to avoid the situation where, due to the closing of the supply lines and outflow lines for heat transfer medium and water, pressure shocks, known as Joukowsky shocks, occur, which may lead to further mechanical load upon apparatuses and pipelines, it is preferable if the pipeline system for the heat transfer medium in the second heat transfer medium circuit has a bypass, to which the supply line and the outflow line for the heat transfer medium are connected, and valves are comprised, which, during normal operation, close the bypass and, upon detection of a break in the heat exchanger, close the supply line and the outflow line to the heat exchanger and open the bypass, so that the heat transfer medium flows through the bypass. By means of the bypass, which is opened as soon as the supply lines and outflow lines for the heat transfer medium into the heat exchanger are closed, the heat transfer medium can flow through the bypass and a pressure shock is avoided. In this case, on the one hand, it is possible to use three-way valves, in which there is a changeover from the flow through the heat exchanger to a flow through the bypass, or, alternatively, to use a combination of two-way valves which are connected such that, when the supply lines and outflow lines are closed, the bypass is opened simultaneously. The switching of the valves is in this case coordinated such that pressure shocks are avoided. This is possible, for example, when the opening of the bypass takes place more quickly than the closing of the supply lines and outflow lines to the heat exchanger. Such a changeover is called shock-free.

The valves by means of which the supply lines and outflow lines for heat transfer medium and water are closed and the bypass is opened are preferably activated pneumatically. In contrast to a pneumatic activation, an electric drive is usually slower, and also an electric drive is more difficult to design as "fail-safe" than a pneumatic drive. However, in order to ensure reliable closing of the supply lines and outflow lines and opening of the bypass even in the event of a possible power failure, electric drives should be dispensed with. A merely redundant electrical energy supply may be deemed unsafe as far as the plant is concerned.

In order, in view of the high pressure difference and the resulting pressure rise in the heat transfer medium after a break of a heat-conducting wall in a heat exchanger, to avoid the situation where heat transfer medium contaminated with water flows, uncontrolled, opposite to the actual flow direction, it is advantageous to position a backflow prevention in the supply line to the heat exchanger. In addition, to reduce the flow velocity in the event of the pressure rise in the heat transfer medium on account of a break of the heat-conducting wall in the heat exchanger, a backflow prevention may also be positioned in the outflow line from the heat exchanger. Suitable backflow prevention is, for example, a diaphragm. Such a diaphragm is usually a disk with an orifice, the diameter of which is smaller than the diameter of the pipeline in which the diaphragm is accommodated. On account of the smaller diameter, a reduction in the volume flow in the region of the diaphragm occurs, so that a backflow can thereby be reduced or even prevented. In this case, backflow prevention takes place, in particular, in that the flow resistance through an emptying line after the opening of a closure opening under limit pressure, as described below, or through a line without a diaphragm is markedly lower than the flow resistance through the backflow-preventing diaphragms. Backstroke preventions which can be used alternatively are difficult to operate reliably in the case of the high temperatures and corrosiveness of the molten salts.

In order to reduce the increased pressure occurring in the heat transfer medium in the event of a break of the heat-conducting wall and thereby to prevent further plant components of the solar power plant from failing, one or more emptying lines are comprised, which are in each case closed by means of securing closures which open when a limit pressure is overshot. Such securing closures may be overflow devices, also functioning as safety valves, or bursting disks.

The emptying lines may be arranged in one or more outflow lines downstream of at least one heat exchanger in the flow direction of the heat transfer medium. It is preferable, however, that the emptying lines are located as near as possible to the heat exchangers. This is achieved, for example, in that one or more emptying lines is or are arranged on each heat exchanger, these being mounted, for example, directly on apparatus flanges.

A collecting tank is connected via one or more emptying lines. The collecting tank is preferably operated atmospherically in order to ensure an unimpeded discharge of pressure out of one or more heat exchangers. The collecting tank is to be protected against the risk of hot heat transfer medium splashing out into the surroundings. The collecting tank is preferably designed to be of a size such that, in the event of a break, the entire heat transfer medium from the heat exchangers, together with the supply line content, can be accommodated reliably and, in addition, sufficient space remains for gas which is formed.

The securing closure prevents heat transfer medium from being able to flow into the collecting tank when the solar power plant is running in a fault-free manner. Should a heat-conducting wall in the heat exchanger break and water enter the heat transfer medium, the pressure in the heat transfer medium rises. The result of this increased pressure is that the securing closure opens the emptying line into the collecting tank. Heat transfer medium and gases which are formed can then flow into the collecting tank, so that the pressure inside the pipelines in the first heat transfer medium circuit rises only minimally or preferably does not rise at all.

On account of the high temperature of the heat transfer medium even after it leaves the heat exchanger, it is advantageous, furthermore, if the emptying lines branch off upwardly from the outflow line or the heat exchangers. The upward branch-off prevents solids from being deposited in the emptying line and possibly putting the functioning of the securing closure at risk.

In order to avoid damage to the securing closure, for example due to corrosion on account of contact with the heat transfer medium, it is advantageous, furthermore, if the emptying line is filled with gas, the gas being held at a pressure which corresponds to the pressure of the heat transfer medium leaving the heat exchanger, so that no heat transfer medium flows into the emptying line. On the other hand, however, care must also be taken to ensure that the pressure of the gas does not exceed the pressure of the heat transfer medium in the outflow line from the heat exchanger, so that no gas flows into the outflow line or into a heat exchanger. It is especially advantageous if the pressure of the gas is selected such that a small quantity of the heat transfer medium enters the emptying line, but in this, in the case of an upwardly branching-off emptying line, rises to a height of, for example, a maximum of 50 cm, preferably a maximum of 25 cm and especially a maximum of 10 cm. In order to prevent more heat transfer medium from flowing into the emptying line during normal operation, it is possible, for example, to measure the pressure of the heat transfer medium in the region of the branch-off of the emptying line and of the gas in the emptying line and to set the pressure of the gas by discharge or follow-up of gas such that the pressure difference between the pressure of the heat transfer medium and the pressure of the gas is set such that the maximum filling height of the heat transfer medium in the emptying line is not overshot.

The gas cushion arranged upstream of the securing closure acts as a thermal insulator, so that less heat is discharged from the heat transfer medium.

The gas with which the emptying line is filled is preferably plant gas, that is to say gas which can be extracted, for example, from the plant via a central exhaust gas outlet. If excess gas volume occurs in the plant, for example as a result of thermal expansion in the event of a temperature rise, it is necessary to capture the discharged gas and store it in a suitable gas tank. Alternatively, it is also possible to compress the plant gas and introduce it into a compressed gas accumulator. The plant gas is utilized, for example, in order to fill unoccupied volume in the hot store and in the cold store.

In order, during necessary emptying of the heat exchanger into the collecting tank, to prevent the situation where heat transfer medium freezes in the region of the securing closure and thereby blocks the inflow into the collecting tank, it is advantageous, furthermore, if the securing closure comprises heating, by means of which the securing closure is heated to a temperature above the solidification temperature of the heat transfer medium. The temperature to which the securing closure is heated may in this case be lower than the operating temperature of the heat transfer medium. Care must merely be taken to ensure that the temperature is kept above the solidification temperature. The solidification temperature is in this case dependent on the heat transfer medium used. A temperature above the solidification temperature may, on the one hand, be ensured by means of temperature regulation, and, on the other hand, it is also possible to place the securing closure so far away from the hot process side that a suitable temperature is established in an equilibrium between supply of heat from the hot process side and radiation of heat into the surroundings. A suitable temperature may also be set by the choice of the construction material and by the choice of thermal insulation thickness.

If the temperature at which the securing closure is held is lower than the temperature of the heat transfer medium during continuous operation, the gas in the emptying line acts as a thermal insulator. It is thus possible to thermally decouple the securing closure and further measuring and regulating instruments sensitive to high temperatures from the process side, for example the outflow line, with its high temperatures of up to 600° C.

By the securing closure being placed in a gas space, additional protection against contact with the heat transfer medium, for example in order to avoid corrosion and resulting damage to the securing closure, is achieved. Thermal insulation at a lower temperature level also prolongs the service life of the securing closure and improves its functional reliability.

Protection against settling solids is afforded by an upwardly leading emptying line. The functional reliability of the securing closure is consequently improved.

So that the protective gas phase is maintained upstream of the securing closure, gas must be fed in when the level of the heat transfer medium in the emptying line is too high. Infeed may be regulated via level measurement. Level measurement may take place, for example, by means of a vibrating limit switch which can be decoupled thermally from the hot medium via a siphon. Alternatively, a level control also can be realized by using a temperature limit switch, as a wetting of the temperature limit switch with heat transfer medium leads to a strong temperature increase on the temperature limit switch.

A suitable securing closure by means of which the inflow into the collecting tank is closed is, for example, a bursting disk. The bursting disk is in this case designed such that it breaks at a specific pressure lying above the normal operating pressure and thus releases the inflow into the collecting tank. So that pressure fluctuations occurring during operation do not lead to a breakage of the bursting disk, it is preferable if the latter breaks only when a pressure of 15 bar above the maximum operating pressure, preferably of 10 bar above the maximum operating pressure and, in particular, of 3 bar above the maximum operating pressure is reached.

In order to avoid a situation where the bursting disk is damaged by corrosion, it is preferable if the bursting disk is arranged in a position in which it is washed around by gas. For this purpose, it is possible, for example, as described above, to arrange the bursting disk in the gas-field region of the emptying line.

In order to detect a possible break in the heat-conducting wall, according to the invention a break detection system is used. Such a break detection system is preferably designed to be diversely redundant, so as to have available, in the event of a possible failure of one system, a second system by means of which a break can be detected. To increase the safety level of the switchings, safety switching may be initiated when only one detector is triggered. If, for economic reasons, the situation is to be avoided where a faulty switch-off of the heat exchanger takes place due to misdetection, safety switching may be carried out only when two detectors are triggered.

Suitable break detection systems are, for example, pressure measurement in the first heat transfer medium circuit, a trigger sensor of the securing closure or an oscillation analysis of the heat exchanger. In order, in the event of a pressure measurement, to avoid the situation where the sensor is damaged by the heat transfer medium, it is preferable to position the pressure sensor in a region in which there is no contact with the heat transfer medium, for example in the gas-filled region of the emptying line. If a bursting disk is used as a securing closure of a heat exchanger, it is especially preferable if the trigger sensor of the bursting disk acts as a break sensor of the heat exchanger.

If oscillation analysis is employed in order to detect a break of the heat-conducting wall, it is possible, for example, to record constantly the noise generated in the heat exchanger by the flow of the water and of the heat transfer medium. A frequency spectrum is obtained from this noise by Fourier transformation. The frequency spectrum is in this case determined in a learning phase for each heat exchanger as a function of the load. From this learning phase, frequency-dependent limit values are defined, safety switching taking place when these are overshot. Preferably, high frequencies are adopted for the detection of breaks of the heat-transmitting wall.

In order to detect small leakages, however, the above-mentioned methods are not sensitive enough. However, detection of small leakages may take place by process-analytic investigation of analysis gas. Analysis gas is process gas which is extracted from the process for the purpose of analysis. In this case, water can be found by cooling and condensation of analysis gas which is formed in the first heat transfer medium circuit. Furthermore, in the case of nitrates or nitrites of alkali metals as heat transfer medium, infiltrating water can be deduced from the nature and quantity of nitrogen oxides formed. The nitrogen oxides can be determined, for example, in the gas space by infrared spectroscopy, for example FTIR or NDIR. In particular, laughing gas is an effective indicator of infiltrated water.

In addition, it is also possible to carry out an analysis of the heat transfer medium and at the same time look for the reaction products which arise due to reaction with water.

The analysis gas may in this case be extracted, for example, from the gas space which has been constructed for the protection of the securing closure.

In order to prevent the situation where, in the event of a break of the heat-conducting wall in a heat exchanger, contaminated heat transfer medium enters the cold store or else the hot store, a quarantine tank is preferably accommodated in the outflow line. Since the heat transfer medium flows first into the quarantine tank and enters the cold store only after running through the quarantine tank, additional time is gained once again in order to interrupt the flow of heat transfer medium in the event of a break. For this purpose, the quarantine tank preferably comprises fittings, for example floors, around which the heat transfer medium flows, in order thereby to avoid full mixing of the heat transfer medium in the quarantine tank and, moreover, to ensure that the heat transfer medium which has flowed in first is also the first to leave the quarantine tank again. The quarantine tank is in this case preferably positioned downstream of the emptying line into the collecting tank in the flow direction of the heat transfer medium. This ensures that the contaminated heat transfer medium does not have to flow through the quarantine tank before it runs out into the collecting tank. Furthermore, the quarantine tank is preferably positioned upstream of the valve for closing the outflow line in the flow direction of the heat transfer medium. This avoids the situation where contaminated heat transfer medium can flow into the cold store after leaving the quarantine tank.

The heat transfer medium used is conventionally a molten salt. In addition to a molten salt, however, any other heat transfer medium conventional for a solar power plant may also be used. It is preferable, however, to use a molten salt. Especially suitable salts for the molten salt are alkali metal nitrate, alkali metal nitrite, a mixture of different alkali metal nitrates or of alkali metal nitrites or a mixture of alkali metal nitrate and of alkali metal nitrite. The alkali metal sodium or potassium is most especially preferred. Preferred mixtures are sodium nitrate and potassium nitrate, sodium nitrate, potassium nitrate and potassium nitrite or potassium nitrate and potassium nitrite. However, any other mixture is likewise possible. The fraction of the respective salt is selected according to the desired operating temperature. In the case of higher operating temperatures, a larger fraction of nitrates is used, and in the case of lower operating temperatures a larger fraction of nitrites is used. A generally conventional salt used is what is known as solar salt, a mixture of 60% by weight of sodium nitrate and 40% by weight of potassium nitrate.

Even if other molten salts are used as nitrate and nitrite mixtures, it may be necessary to secure the heat exchangers against breakage. Thus, at very high temperatures, for example, chlorides generate hydrogen chloride gas which is harmful with steam and fluorides generate the extremely toxic hydrogen fluoride gas.

If a plurality of heat exchangers are comprised, it is possible to provide the above-described devices, that is to say the valves for closing the supply line and outflow line, the bypass, the backflow prevention, the collecting tank and the quarantine tank, separately for each heat exchanger or jointly in each case for two or more heat exchangers or else for all the heat exchangers. For this purpose, the corresponding devices are arranged in each case either upstream or downstream of a distributor into the individual heat exchangers and correspondingly downstream or upstream of a convergence from the individual heat exchangers.

The detection systems and the emptying lines with the securing closure may also be set up in multiple form. By means of multiple detection, a break can be located and the range of safety switching can be limited to the damaged heat exchanger.

Solar power plants according to the invention are, in particular, linearly concentrating solar power plants, such as parabolic trough solar power plants or Fresnel solar power plants or tower power plants, in which the receiver is arranged on a tower and solar radiation is reflected from mirrors arranged around the tower onto the tower tip.

Separate stores or a common store, which in this case is designed as a layered store, may be used as the hot store and cold store for the heat transfer medium. It is also possible to provide a plurality of hot stores and a plurality of cold stores.

An exemplary embodiment of the invention is illustrated in the figures and is explained in more detail in the following description.

Figure 2:
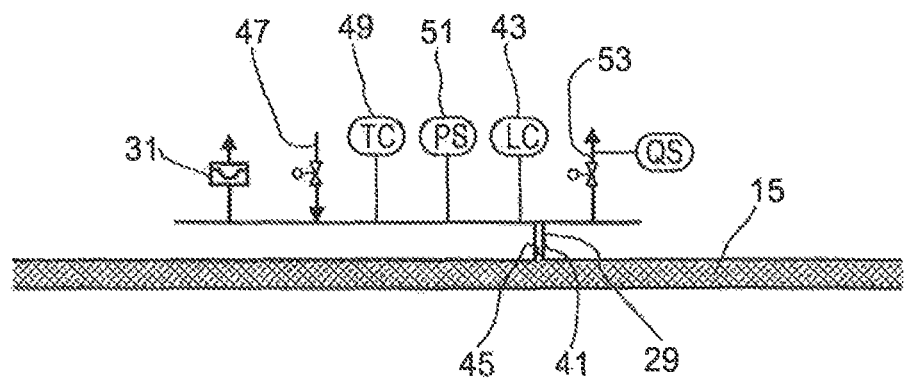
Figure 3:
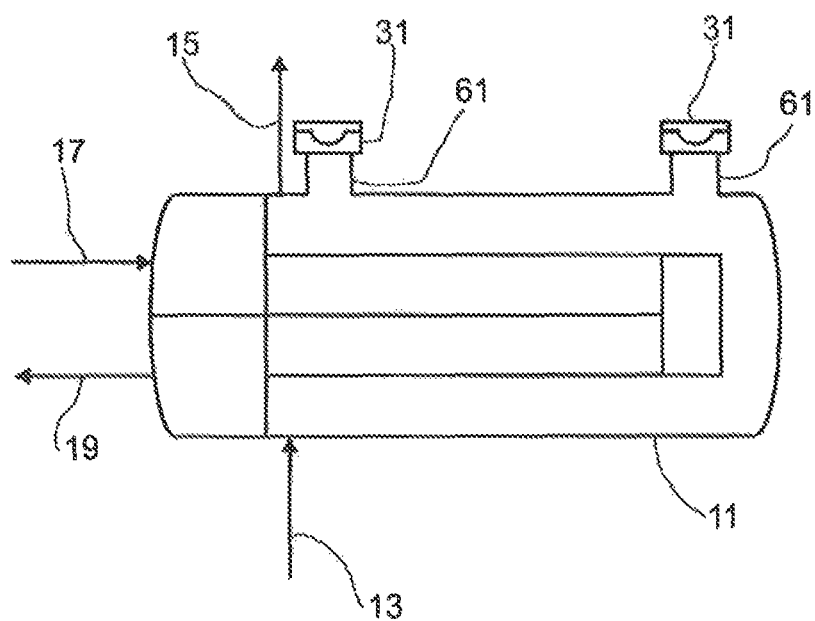

In the figures:

FIG. 1 shows a diagrammatic illustration of the first and the second heat transfer medium circuit of a linearly concentrating solar power plant, FIG. 2 shows an outflow line of the heat transfer medium with an emptying line branching off from it, FIG. 3 shows a heat exchanger with bursting disks as a securing closure.

The first heat transfer medium circuit and the second heat transfer medium circuit of a linearly concentrating solar power plant are illustrated in FIG. 1.

A linearly concentrating solar power plant 1 comprises a hot store 3 and a cold store 5 which are connected to one another by means of a pipeline system 6 of a first heat transfer medium circuit, said pipeline system leading through a solar array 7. In the event of solar radiation, heat transfer medium is conducted out of the cold store 5 through the solar array 7, is heated in the solar array 7 by the radiant solar energy and is led further on to the hot store 3.

In order to heat the heat transfer medium, for example a molten salt, in the solar array by means of radiant solar energy, receivers are arranged in the solar array. In the receivers, the incident sunlight is reflected in a focused manner with the aid of mirrors onto a pipeline in which the heat transfer medium flows. As a result, the heat transfer medium heats up. In linearly concentrating solar power plants, the receivers are connected in parallel and in series over long distances. In the case of parabolic trough solar power plants, the mirrors are arranged in each case in the form of a parabolic trough around the line, and in Fresnel solar power plants movable mirrors are arranged underneath the pipelines, the mirrors being oriented according to the direction of the solar radiation, in order always to ensure optimal utilization of the radiant solar energy. The receiver lines in the linearly concentrating solar power plant may in this case run linearly parallel to one another, as illustrated here, or else as pipeline loops.

Alternatively to the solar array 7, illustrated here, of a linearly concentrating solar power plant, it is also possible, for example, to use a tower power plant in which the receiver is arranged as the tip on a tower and the mirrors are oriented onto the tower tip.

The set-up of a linearly concentrating solar power plant or of a tower power plant and the arrangement of the receivers in the solar array 7 or on the tower of the tower power plant are known to a person skilled in the art.

When the solar power plant is in operation, the heated heat transfer medium is introduced from the hot store 3 into a second pipeline system 9 of a second heat transfer medium circuit independently of radiant solar energy, that is to say at the times when the sun is not shining. During regular operation, the heat transfer medium is supplied to at least one heat exchanger 11 in which water is preheated, evaporated and superheated. For this purpose, in the heat exchanger 11, heat is transmitted from the heat transfer medium to the water indirectly via a heat-conducting wall, by means of which the region through which the heat transfer medium flows and the region through which the water flows are separated. In this case, it is possible to preheat, evaporate and superheat the water in one heat exchanger or in the plurality of heat exchangers. If a plurality of heat exchangers 11 are used, these may be connected in parallel, so that, in each heat exchanger 11, part of the water is preheated, evaporated and superheated by transmission of heat from part of the heat transfer medium. It is also possible to connect heat exchangers 11 in series. In this case, for example, one heat exchanger is used for evaporating the steam and a further heat exchanger for superheating the steam. It is also possible to connect heat exchangers both in series and in parallel.

In order to transmit heat from the heat transfer medium to the water in the heat exchanger 11, heat transfer medium is fed into the heat exchanger via a first supply line 13. The heat transfer medium flows through the heat exchanger 11 and leaves this through a first outflow line 15. The water to be evaporated and to be superheated is supplied via a second supply line 17, and the superheated steam generated in the heat exchanger 11 is drawn off through a second outflow line 19 and routed to a turbine. The turbine is driven with the aid of the superheated steam and is connected to a generator in which electrical energy is generated.

After flowing through the heat exchanger 11, the heat transfer medium flows back into the cold store 5.

Since high loads act upon the heat-conducting walls in the heat exchanger on account of the high pressure difference between the superheated steam and the heat transfer medium, these walls may break. The result of a break of the heat-conducting wall is that water comes into contact with the heat transfer medium, and if molten salts, in particular nitrites and nitrates of alkali metals, are used, this may lead to a chemical reaction, with nitrogen oxides and alkali metal hydroxides being formed. Moreover, if nitrites are used, the reaction with water also gives rise to nitrates which have a higher solidification temperature than the nitrites. Owing to contact with water, therefore, the heat transfer medium is damaged and can no longer be used during the normal operation of the solar power plant. Moreover, the alkali metal hydroxides which occur have a corrosive action and may damage the material of the plant components of the solar power plant. Due to the formation of nitrogen oxides and also because of the markedly higher pressure in the steam circuit, the pressure in the second heat transfer medium circuit rises.

In order to recognize a possible break, a break detection system 21 is used. As described above, what are suitable for this are, for example, pressure measurement, a break sensor of a bursting disk or oscillation analysis.

When a break is detected, the supply line 13 for the heat transfer medium into the heat exchanger 11, the outflow line 15 for the heat transfer medium into the heat exchanger 11 and also the supply line 17 and the outflow line 19 for the water are closed, in order to avoid the situation where heat transfer medium contaminated with water enters the cold store 5 and possibly reaches from there, through the pipeline system 6 and the solar array 7, into the hot store 3. Valves 23 are provided for closing the supply lines 13, 17 and the outflow lines 15, 19 into the heat exchanger 11.

In order to prevent a pressure shock in the pipeline system 9 of the second heat transfer medium circuit, preferably, as illustrated here, the supply line 13 and the outflow line 15 for the heat transfer medium are connected to one another via a bypass 25. For this purpose, as illustrated here, it is possible to provide three-way valves, a first valve 23.1 being arranged in the supply line 13 of the heat transfer medium to the heat exchanger 11 and a second valve 23.2 being arranged in the outflow line 15 of the heat transfer medium from the heat exchanger 11. In the event of breakage or leakage in the heat exchanger 11, the inflow line 13 and the outflow line 15 are closed and the bypass 25 opened by means of corresponding changeover of the valves 23.1, 23.2. The heat transfer medium can thereby flow further on, unimpeded, and a pressure shock can be avoided. Alternatively, it is also possible, instead of the three-way valves 23.1, 23.2 illustrated here, to provide in each case two two-way valves, in each case one valve being used for closing the inflow line 13 and the outflow line 15 and a second valve being used for opening the bypass. Since the opening and closing of lines can be controlled individually in each case when two two-way valves are used, this embodiment is preferred.

In order, in the event of a break of a heat-conducting wall in the heat exchanger 11 or in the event of a leak, to prevent a major pressure rise in the pipeline system 9 of the second heat transfer medium, in a preferred embodiment a collecting tank 27 is connected via an emptying line 29 to the outflow line 15 from the heat exchanger 11. For this purpose, the emptying line 29 preferably branches off upwardly from the outflow line 15. By being branched off upwardly, the emptying line, which is preferably flooded with gas, acts as a thermal convection brake.

In order to avoid the situation where heat transfer medium flows during normal operation into the collecting tank 27, the latter is closed by means of a securing closure 31. The securing closure 31 is in this case configured such that it opens the inflow into the collecting tank 27 in the event of a pressure rise in the outflow line 15 and consequently in the emptying line 29. A suitable securing closure 31 is in this case, for example, a bursting disk.

In order, furthermore, in the event of a pressure rise due to ingress of the water into the heat transfer medium, to prevent the situation where the heat transfer medium flows with high velocity through the outflow line 15 and, in particular, flows back through the inflow line 13 opposite to the actual flow direction, backflow preventions 33 are preferably installed in the inflow line 13 and the outflow line 15.

Suitable backflow preventions 33 are, for example, diaphragms in the respective lines, the throughflow cross section being reduced by means of the diaphragms in the region of the respective diaphragm.

In order, furthermore, to avoid the situation where heat transfer medium contaminated with water enters the cold store before the valves 23 are closed, it is preferable, furthermore, if a quarantine tank 35 is accommodated in the outflow line 15 upstream of the second valve 23.2 in the flow direction of the heat transfer medium. The heat transfer medium flows through the quarantine tank 35, with the result that the transient time between the heat exchanger 11 and the cold store 5 is increased. If heat transfer medium is contaminated with water, this therefore collects in the quarantine tank and can be extracted correspondingly from the quarantine tank. This is advantageous particularly when part of the heat transfer medium contaminated with water has already flowed past the branch-off to the collecting tank 27 before the securing closure 31 opens, or when the pressure in the outflow line 15 is so high that, in spite of the securing closure 31 being opened, part of the heat transfer medium flows further on in the outflow line 15.

The quarantine tank 35 preferably accommodates fittings, around which the heat transfer medium flows, in order to avoid the situation where full mixing occurs in the quarantine tank 35. The fittings ensure that the heat transfer medium which has flowed first into the quarantine tank 35 is also the first to flow out of the quarantine tank 35 again. Suitable fittings are, for example, floors, around which the heat transfer medium flows in a meandering manner.

FIG. 2 shows an outflow line of the heat transfer medium with an emptying line branching off from it.

The emptying line 29 branches off from the outflow line 15 upwardly. In order to protect the securing closure 31 against too high temperatures and against contact with the heat transfer medium during the normal operation of the solar power plant 1, the emptying line 29 is filled with gas. A gas space 41 is consequently formed in the emptying line.

Filling level measurement 43 with regulation on the emptying line 29 ensures the level of the phase limit 45 between gas and heat transfer medium. If the liquid level is too high, process gas can be conducted into the gas space 41 via a gas line 47. If the level is low, there is no need for any measure.

Furthermore, a temperature sensor 49 with regulation and heating may be placed in this gas space 41 decoupled thermally from the process conditions in the second heat transfer medium circuit. It is consequently possible to keep the temperature of the gas space 41 reliably always above the solidification temperature of the heat transfer medium.

Pressure measurement 51, which usually cannot be operated up to the maximum operating temperature, may also be arranged on the thermally insulated gas space 41. Pressure measurement 51 may be used as a detector for a break of a heat-conducting wall in the heat exchanger 11. If a stipulated limit value is overshot, pressure measurement can trigger safety switching, by means of which, for example, the valves 23 are closed.

Analysis gas may be extracted from the thermally decoupled gas space 41 via an analysis line 53. By the analysis gas being analyzed for water, nitrogen oxides and further reaction products, a break or a small leakage in a heat exchanger 11 can be detected. In addition, it is also possible, when the pressure in the gas space 41 is too high, to discharge gas via the analysis line 53.

A heat exchanger with bursting disks as a securing closure is illustrated in FIG. 3.

Alternatively to the embodiment illustrated in FIGS. 1 and 2, in which the emptying line 29 is connected to the outflow line 15, it is also possible to mount the emptying line directly on the heat exchanger 11. For this purpose, at least one flange 61, to which the emptying line 29 can be connected, is formed on the heat exchanger 11. The securing closure 31 is accommodated in the at least one flange 61, the heat exchanger 11 having two flanges 61 in the embodiment illustrated here. If a limit pressure is overshot, the securing closure 31 opens, and the heat transfer medium can flow directly out of the heat exchanger 11 into the emptying line 29.

LIST OF REFERENCE SYMBOLS

1 Solar power plant
3 Hot store
5 Cold store
6 Pipeline system of a first heat transfer medium circuit
7 Solar array
9 Pipeline system of a second heat transfer medium circuit
11 Heat exchanger
13 Supply line of the heat transfer medium
15 Outflow line of the heat transfer medium
17 Supply line for water
19 Outflow line for steam
21 Break detection system
23 Valve
23.1 First valve
23.2 Second valve
25 Bypass
27 Collecting tank
29 Emptying line
31 Securing closure
33 Backflow prevention
35 Quarantine tank
41 Gas space
43 Filling level measurement
45 Phase limit
47 Gas line
49 Temperature measurement
51 Pressure measurement
61 Flange

The invention claimed is:

1. A solar power plant with a first heat transfer medium circuit and with a second heat transfer medium circuit, in which the first heat transfer medium circuit comprises a store for hot heat transfer medium and a store for cold heat transfer medium and also a pipeline system connecting the stores for hot heat transfer medium and for cold heat transfer medium and leading through a solar array, and the second heat transfer medium circuit comprises a pipeline system connecting the stores for hot heat transfer medium and for cold heat transfer medium and in which at least one heat exchanger for the evaporation and superheating of water is accommodated, the at least one heat exchanger having a region through which the heat transfer medium flows and a region through which water flows, said regions being separated by a heat-conducting wall, so that heat can be transmitted from the heat transfer medium to the water, wherein each heat exchanger has a break detection system, by means of which a possible break of the heat-conducting wall can be detected, and valves for the closing of supply lines and outflow lines for heat transfer medium and water, upon the detection of a break the valves in the supply lines and outflow lines for heat transfer medium and water being closed, wherein the break detection system is established to detect small leakages by process-analytic investigation of analysis gas.

2. The solar power plant as claimed in claim 1, wherein the pipeline system for the heat transfer medium in the second heat transfer medium circuit has a bypass, to which the supply line and the outflow line for the heat transfer medium are connected, and valves are comprised, which close the bypass during normal operation and, when a break is detected in the heat exchanger, close the supply line and the outflow line to the heat exchanger and open the bypass, so that the heat transfer medium flows through the bypass.

3. The solar power plant as claimed in claim 1, wherein a backflow prevention is positioned in the supply line to the heat exchanger.

4. The solar power plant as claimed in claim 3, wherein the backflow prevention is a diaphragm.

5. The solar power plant as claimed in claim 1, wherein one or more emptying lines are comprised, which are in each case closed by means of securing closures which open when a limit pressure is overshot.

6. The solar power plant as claimed in claim 5, wherein in each case one or more emptying lines issue into a collecting tank.

7. The solar power plant as claimed in claim 5, wherein the emptying lines in each case branch off upwardly from the outflow line.

8. The solar power plant as claimed in claim 5, wherein the emptying line is filled with gas, the gas being held at a pressure which corresponds to the pressure of the heat transfer medium leaving the heat exchanger, so that no heat transfer medium flows into the emptying line.

9. The solar power plant as claimed in claim 5, wherein the securing closure comprises heating, by means of which the securing closure is heated to a temperature above the solidification temperature of the heat transfer medium.

10. The solar power plant as claimed in claim 5, wherein the emptying lines are arranged in one or more outflow lines downstream of at least one heat exchanger in the flow direction of the heat transfer medium or are in each case mounted directly on apparatus flanges of the heat exchanger.

11. The solar power plant as claimed in claim 5, wherein the securing closure is a bursting disk.

12. The solar power plant as claimed in claim 11, wherein the bursting disk is washed around with gas.

13. The solar power plant as claimed in claim 1, wherein a quarantine tank is accommodated in the outflow line.

14. The solar power plant as claimed in claim 13, wherein one or more emptying lines are comprised, which are in each case closed by means of securing closures which open when a limit pressure is overshot and the quarantine tank is positioned downstream of the emptying line in the flow direction of the heat transfer medium.

15. The solar power plant as claimed in claim 1, wherein the heat transfer medium is a molten salt.

16. The solar power plant as claimed in claim 1, wherein the heat transfer medium is an alkali metal nitrate, an alkali metal nitrite, a mixture of different alkali metal nitrates or of alkali metal nitrites or a mixture of alkali metal nitrate and of alkali metal nitrite.

* * * * *